US007818329B2

(12) United States Patent
Campbell et al.

(10) Patent No.: US 7,818,329 B2
(45) Date of Patent: Oct. 19, 2010

(54) METHOD AND APPARATUS FOR AUTOMATIC MULTIMEDIA NARRATIVE ENRICHMENT

(75) Inventors: Murray S. Campbell, Yorktown Heights, NY (US); Shahram Ebadollahi, White Plains, NY (US); Matthew L. Hill, Yonkers, NY (US); Brian Michael Landry, Atlanta, GA (US); Chung-Sheng Li, Scarsdale, NY (US); Apostol Ivanov Natsev, Harrison, NY (US); Milind R. Naphade, Fishkill, NY (US); John R. Smith, New Hyde Park, NY (US); Jelena Tesic, New York, NY (US); Lexing Xie, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 11/759,654

(22) Filed: Jun. 7, 2007

(65) Prior Publication Data
US 2008/0306925 A1     Dec. 11, 2008

(51) Int. Cl.
*G06F 17/30* (2006.01)
(52) U.S. Cl. ................. 707/755; 707/791; 707/999.004
(58) Field of Classification Search ...................... 707/1, 707/3, 6, 10, 755, 791, 999.003–999.006, 707/999.102; 715/256
See application file for complete search history.

(56) References Cited
U.S. PATENT DOCUMENTS
5,345,586 A * 9/1994 Hamala et al. .................... 1/1

| 5,721,902 | A  | * | 2/1998  | Schultz ........................... 707/4 |
| 6,507,838 | B1 | * | 1/2003  | Syeda-Mahmood ............ 707/3 |
| 6,624,826 | B1 | * | 9/2003  | Balabanovic ................ 715/727 |
| 6,957,226 | B2 | * | 10/2005 | Attias ........................ 707/102 |
| 7,596,753 | B2 | * | 9/2009  | Smith et al. .................. 715/256 |
| 7,610,306 | B2 | * | 10/2009 | Lin et al. ............................ 1/1 |
| 2005/0108775 | A1 | * | 5/2005  | Bachar et al. ............. 715/500.1 |
| 2005/0114036 | A1 | * | 5/2005  | Fruhling et al. ............... 702/19 |
| 2006/0294071 | A1 | * | 12/2006 | Weare et al. .................... 707/3 |

(Continued)

OTHER PUBLICATIONS

"Marvel", International Business Machines Corporation research, http://domino.research.ibm.com/comm/research_projects.nsf/pages/marvel.index.html, updated Jul. 21, 2006, 2 pages.

(Continued)

*Primary Examiner*—Marc R Filipczyk
(74) *Attorney, Agent, or Firm*—Yee & Associates, P.C.; Preston J. Young (57) ABSTRACT

A method and apparatus is disclosed that receives an input narrative in a particular media format, and produces therefrom a multimedia enriched version of the input narrative. In one embodiment, a method is provided for enriching an input narrative with multimedia content, wherein the method includes the step of selectively segmenting the input narrative to form queries pertaining to different portions or elements of the input narrative. The method further comprises retrieving multimedia artifacts from one or more multimedia repositories, wherein each retrieved multimedia artifact is associated with one of the queries, and selecting a subset of the retrieved multimedia artifacts, wherein the subset includes artifacts comprising different types of multimedia content. The input narrative is then combined with respective multimedia artifacts of the subset, in order to provide an enriched and enhanced narrative.

19 Claims, 4 Drawing Sheets

U.S. PATENT DOCUMENTS

2007/0250496 A1* 10/2007 Halliday et al. ............... 707/5

OTHER PUBLICATIONS

"Columbia News Video Search Engine and TRECVID 2005", DVMM, http:www.ee.columbia,edu/ln/dvmm/researchProjects/MultimediaIndexing/TRECVID2005.htm, last updated Jan. 2, 2006, pp. 1-6.

Campbell et al., "IBM Research TRECVID-2006 Video Retrieval System", pp. 1-20.

Chu-Carroll et al., "IBM's Piquant II in TREC2005", http://citeseer,ist,psu.edu/750894.html, Proceedings of ACL, 2004, pp. 575-582.

Benitez et al., "Multimedia Knowledge Integration, Summarization and Evaluation", Dept. of Electrical Engineering, Columbia University, 2002, 12 pages.

Barzilay et al., "Inferring Strategies for Sentence Ordering in Multidocument News Summarization", Jounal of Artificial Intelligence Research 17, Aug. 2002, pp. 35-55.

Maarek et al., "Full Text Indexing Based on Lexical Relations: An Application: Software Libraries", Proceedings of 12th International ACM SIGIR Conference on Research and Development in Information Retrieval, 1989, pp. 198-206.

Girgensohn et al., "Hyper-Hitchcock: Authoring Interactive Videos and Generating Interactive Summaries", Proceedings of 11th ACM International Conference on Multimedia, 2003, 2 pages.

Hua et al., "Optimization-Based Automated Home Video Editing System", IEEE Transactions in Circuits and Systems for Video Technology, vol. 14, Issue 5, May 2004, pp. 572-583.

"World Wide Web Consortium (W3C)", http://www.w3.org, printed May 16, 2007, pp. 1-5.

"The MPEG Home Page", http://www.chiariglione.org/mpeg, printed May 16, 2007, 1 page.

Davis, "Editing Out Video Editing", IEEE MultiMedia Magazine, Apr.-Jun. 2003, pp. 1-12.

Duygulu et al., "Object Recognition as Machine Translation: Learning a Lexicon for a Fixed Image Vocabulary", 2002, 15 pages.

Sawhney et al., "Authoring and Navigating Video in Space and Time", IEEE MultiMedia Magazine, Oct.-Dec. 1997, pp. 30-39.

Lavrenko et al., "A Model for Learning the Semantics of Pictures", Center for Intelligent Information Retrieval, 2003, 8 pages.

"Synchronized Multimedia", W3C Synchronized Multimedia Home page, http://www.w3.org/AudioVideo/, printed May 16, 2007, pp. 1-10.

"What is MediaMill?", http://www.science.uva.nl/research/mediamill/,May 7, 2007, 2 pages.

* cited by examiner

METHOD AND APPARATUS FOR AUTOMATIC MULTIMEDIA NARRATIVE ENRICHMENT

BACKGROUND OF THE INVENTION

1. Field of the Invention

The invention disclosed and claimed herein generally pertains to a method and apparatus for enriching a narrative or other descriptive message, by acquiring pertinent multimedia objects or artifacts for presentation with the narrative. More particularly, the invention pertains to a method of the above type wherein objects of multimedia content can be searched out and retrieved for presentation with different segments or portions of the narrative. Even more particularly, the invention pertains to a method of the above type that can readily be used by persons without special training or equipment, in order to enrich virtually any narrative or other descriptive message with diverse multimedia content.

2. Description of the Related Art

Different media, such as text, audio, image, and video, are used to communicate messages, ideas and concepts in computer-based communications. Currently, the majority of the communicated information is uni-modal. For example, a blog post, an e-mail message or a news article is a piece of information in a text-only format, whereas a collection of vacation photos only portrays the information about the vacation in image form. However, certain media are most suitable for communicating certain concepts. For example, seeing an image of a "sunset" is more informative than a description of that concept in text form. Ideally, one should be able to compose a message or enrich an already existing message in one medium, partially or totally, with snippets of other, alternative media that illustrate the concepts in the message with their manifestations. The multimedia enhanced message could improve the user's perception of the message, or could transform the message into a form more amenable for communication in a given context.

The proliferation of multimedia content, in various application domains, provides rich repositories of media snippets. However, present systems and approaches, which might be used to access media content for message enrichment, tend to be uni-modal. Accordingly, such approaches are concerned with only a single type of content media. For example, G. Grefenstette and P. Tapainen, in "*What is a word? What is a sentence? Problems of Tokenization*", *Proceedings of the $3^{rd}$ International Conference on Computational Lexicography (COMPLEX'94)*, Budapest, Hungary 1994, provide techniques for parsing text messages and extracting tokens from them. M. Campbell, S. Ebadollahi, M. Naphade, A. P. Natsev, J. R. Smith, J. Tesic, L. Xie, and A. Haubold, "*IBM research TRECVID-2006 video retrieval system*," in *NIST TRECVID Workshop*, (Gaithersburg, Md.), November 2006) provide a system for parsing videos into their constituent elements of temporal structure which are then condensed into a single image (key-frame).

Systems such as JURU use tokens of the above type, obtained from parsing text documents, as queries to retrieve textual content from repositories. In IBM Multimedia Analysis and Retrieval System, features derived from images or structural elements of the above type are used to form queries that can be posed against a repository of images and videos. Text search methods such as those of Y. Maarek and F. Smadja, "*Full Text Indexing Based on Lexical Relations: An Application: Software Libraries*", in *Proceedings of $12^{th}$ International ACM SIGIR Conference on Research and Development in Information Retrieval*, 1989, and its JAVA implementation JURU, disclose search repositories of pre-indexed text documents. The IBM Multimedia Analysis and Retrieval System obtains the best matches in a repository of images and videos based on the closeness of the feature representation of those artifacts. Thus, each of these systems is directed only to objects of a single media, such as text, video or images.

Moreover, given a collection of media objects, there are a variety of systems for stitching them together in order to compose a single document. Once again, however, such systems tend to be uni-modal in scope. For example in A. Girgensohn, F. Shipman, L. Wilcox, "*Hyper-Hitchcock: Authoring Interactive Videos and Generating Interactive Summaries*", in *Proceedings of $11^{th}$ ACM International Conference on Multimedia*, 2003, a system is presented that aids the user in editing multiple video objects to form a single video. In Xian-Sheng HUA, Lie LU, Hong-Jiang ZHANG, "*Optimization-based automated home video editing system*", in *IEEE Transactions in Circuits and Systems for Video Technology*, Volume: 14, Issue: 5, pages: 572-583, May 2004, a system was made to automatically extract segments of a video and concatenate them for summarization of home videos. Regina Barzilay, Noemie Elhadad, and Kathleen R. McKeown. *Inferring Strategies for Sentence ordering in Multidocument News Summarization. Journal of Artificial Intelligence Research*, 17:35-55, 2002, provides a methodology for automatically summarizing and compiling a composite text document using only a multiplicity of other text documents.

It is thus seen that all the above mentioned systems and approaches provide an answer to only a single component of a system required for multimedia narrative enrichment. An end-to-end system and method, which accepts a narration as input and coordinates all necessary tasks to generate a coherent multimedia enriched narrative as an output, does not presently exist. Such necessary tasks would include acquisition of multimedia objects or artifacts for different portions of the narration, and then assembling or composing the respective portions and multimedia artifacts into a coherent multimedia enriched narrative.

SUMMARY OF THE INVENTION

The invention is directed to a method and apparatus that receives a narrative in a particular media format as an input, and then provides a multimedia enriched version of the original input narrative. Embodiments of the invention generally parse or break down the input narrative into segments or elements; construct queries from the narrative elements for use in retrieving associated multimedia artifacts from a repository; select the most relevant retrieved artifacts using automatic or manual means; and then assemble the selected artifacts to compose a coherent multimedia enriched version of the original input narrative. In one embodiment, a method is provided for enriching an input narrative with multimedia content, wherein the method includes the step of selectively segmenting the input narrative to form queries pertaining to different portions or elements of the input narrative. The method further comprises retrieving multimedia artifacts from one or more multimedia repositories, wherein each retrieved multimedia artifacts is associated with one of the queries. A subset of the retrieved multimedia artifacts is then selected, wherein the subset includes artifacts comprising different types of multimedia content. The input narrative is combined with respective multimedia artifacts of the subset, in order to provide an enriched and enhanced narrative.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
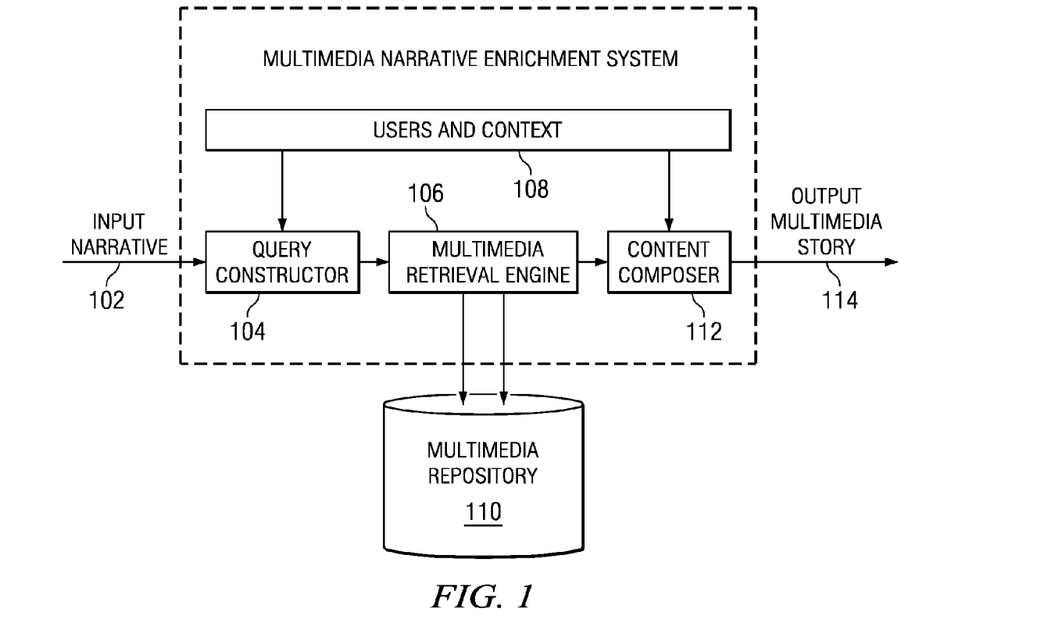
FIG. 1 is a schematic diagram showing respective components for an embodiment of the invention.

Referring to FIG. 1, there is shown a multimedia narrative enrichment system 100 that is constructed in accordance with an embodiment of the invention, wherein system 100 is disposed to receive an input narrative 102. Narrative 102 can generally be any type of descriptive message or communication, and can be in any natural form of transcript in a single, pre-specified medium. Examples of input narrative 102, without limitation, can include a typed paragraph in a user's blog, a news wire article, handwritten notes, handwritten sketches, RSS feeds from online sources, and photographs selected by users. Moreover, it is anticipated that input narratives can be submitted to system 100 for processing by a wide range of users, extending from ordinary users to those seeking a highly professional, commercially usable result. Regardless of the nature of input narrative 102, or the source thereof, system 100 is operable to compose and produce high-quality, multimedia presentations from the input 102 and from large multimedia repositories.

FIG. 1 shows system 100 provided with a query constructor 104 that receives the input narrative 102, and is operable to parse the narrative into segments or elements. The segments are then used to provide search queries, for a multimedia retrieval engine 106. As an illustrative example, the input narrative 102 comprises a paper written by a high school student about a vacation to San Francisco, Calif. The paper contains textual material describing events such as riding a cable car, traveling over Golden Gate Bridge, attending a concert of a popular music group, such as U2, and viewing sea otters in Monterey Bay.

In parsing the textual content of input 102, query constructor 104 generates the segments "cable car", "Golden Gate Bridge", "U2 (or other named group) concerts", "sea otters" and "Monterey Bay". As shown by element 108 of enrichment system 100, both contextual information and other information from the user can be supplied to constructor 104. In response to contextual information such as the timing of respective events and San Francisco as the location, query constructor 104 provides queries such as "San Francisco cable cars", "Golden Gate Bridge", "U2 concerts in San Francisco", "sea otters" and "Monterey Bay". The queries can then be used to search for and retrieve multimedia artifacts.

In order to parse a textual input, constructor 104 could include a JAVA IR system developed by the International Business Machines Corporation (IBM) known as JURU. Alternatively, techniques disclosed in the Grefenstette and Tapainen document, referred to above, could be used for textual parsing. Query constructor 104 could also include an IBM development known as SAW II, which is an interactive system that supports semantic query construction, refinement, and results exploration.

The term "artifact", as such term is used herein, pertains to multimedia objects, or to elements, parts or pieces thereof, including but not limited to photographs, graphics, images, videos, audio, music, text, three dimensional objects, games, virtual worlds, XML, and/or other structured and unstructured information.

Referring further to FIG. 1, there is shown a multimedia repository 110 that can be accessed by multimedia retrieval engine 106. Usefully, repository 110 comprises one or more databases that are accessible by means of the Internet or the like. After receiving queries from query constructor 104 that pertain to respective segments of input narrative 102, engine 106 conducts a search of repository 110 for corresponding multimedia artifacts. Engine 106, for example, may implement a multimedia analysis and retrieval system known as MARVEL, developed by IBM and referred to above, that uses automated tagging of visual content to make digital photographs and content searchable. Engine 106 could also use a system such as JURU, in order to conduct searches and retrieves artifacts in response to respective queries.

Through the operation of retrieval engine 106, a rich diversity of multimedia artifacts, relating to respective segments of the input narrative 102, can be obtained from multimedia repository 110. For the above example, retrieval engine 106 could furnish a video clip of a cable car moving through the streets of San Francisco. It could also retrieve high quality photographic images of the Golden Gate Bridge and of sea otters along a Monterey beach. In addition, engine 106 could retrieve content comprising a brief history of the construction of the Golden Gate Bridge, and also a video of sea otters in Monterey Bay. For the concert, the engine could retrieve press releases, video clips and audio sound tracks associated with the particular music group.

FIG. 1 further shows system 100 provided with a content composer 112 that receives all of the multimedia artifacts respectively retrieved by engine 106. Composer 112 is configured to select the best artifacts, or a preferred subset of artifacts, from all the multimedia artifacts furnished by engine 106. In one embodiment, composer 112 is adapted to successively present each retrieved multimedia artifact, by means of a display screen or the like, to a user of system 100. The user then decides which artifacts to use with the narrative, and the remaining artifacts are discarded. This embodiment is described hereinafter in further detail, in connection with FIG. 3.

The user could also decide how to combine the selected artifacts with respective segments of input narrative 102, in order to provide an output 114 comprising an enriched multimedia story. For example, the user could specify that each narrative segment was to be followed or preceded by a particular corresponding artifact. Retrieved audio, video, and/or images could also be presented simultaneously with corresponding narrative segments, such as by using different portions of a monitor display screen. As an alternative, output 114 could be automatically composed from the selected multimedia artifacts and input narrative segments. This task could be performed, for example, by providing content composer 112 with a tool such as the video editing software MUVEE™.

A further embodiment of the invention provides an automated procedure for selecting multiple artifacts for the narrative, from among all artifacts retrieved by engine 106. In accordance with this embodiment, a user would employ component 108 to pre-specify artifact selection criteria for the content composer 112. Then, for a given input narrative segment, component 112 would use the criteria to rank all artifacts, or all artifacts of a particular type, that had been retrieved for the given segment. The highest ranked artifact of each type, based on the criteria, would then be automatically selected for integration with the input narrative 102, in order to compose the enriched multimedia output 114. To carry out the ranking procedure, content composer 112 could be provided with a tool such as the IBM Multimedia Analysis and Retrieval System.

Figure 2:
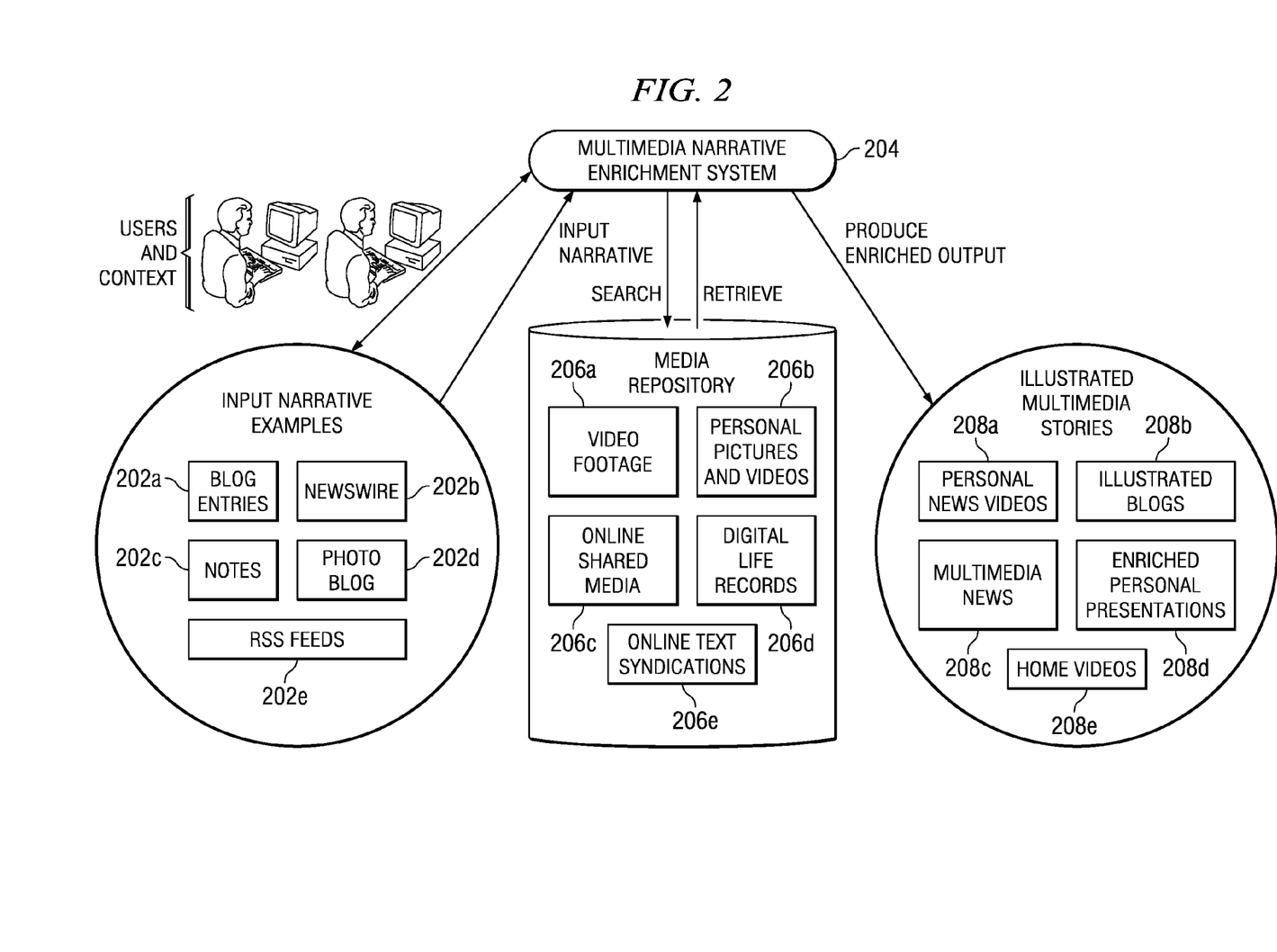
FIG. 2 is a schematic diagram illustrating certain components of FIG. 1 in further detail.

Referring to FIG. 2, there are shown illustrative examples of input narratives 202a-e that can be used in accordance with embodiments of the invention. Narratives 202a and 202b are type written paragraphs of text from a user's computer, website or blog, and from a newswire article, respectively. Narrative 202c is a handwritten note, narrative 202d is a photograph from a user's blog, and narrative 202e is an RSS feed from an Internet source. As is known by those of skill in the art, RSS formats are specified in XML, and provide a family of web feed formats used to publish frequently updated digital comment, such as blogs, news feeds, and pod casts.

FIG. 2 also shows examples of multimedia content sources 206a-e, contained in a media repository 206. These sources are provided for search and retrieval of media artifacts or objects, in order to enrich narratives as described above in connection with FIG. 1. Source 206a comprises professionally produced video that is available at Internet websites, such as television news and other programming. Source 206a may include "long tail" video footage, that is, raw or non-broadcasted video.

Source 206b pertains to personal videos, photographs and other images made available at websites by individuals, and source 206c pertains to online shared media. This type of media can be located at websites such as YouTube (copyright © 2007 YouTube, Inc.) and Flickr (copyright © 2007 Yahoo! Inc.), which are available for storage, search, and access of media by virtually any user. Source 206d pertains to digital life records, such as emails, voicemails, and sound recordings. Online text syndications 206e can include sources such as RSS news feeds and news groups.

Referring further to FIG. 2, there is shown a multimedia narrative enrichment system 204, which is similar or identical to system 100 discussed above. Accordingly, system 204 receives respective input narratives, searches repository 206 for related multimedia artifacts, and retrieves related artifacts that are found. System 204 then produces illustrated multimedia stories as an output. Thus, system 204 enables individuals to act as "citizen journalists", and produce personal news videos 208a or illustrated blogs 208b. System 204 could also be used to produce multimedia news 208c, enriched personal presentations 208d, of many different kinds, and enriched home videos 208e. The presentation described above in connection with FIG. 1 is an illustration of enriched output type 208d.

Figure 3:
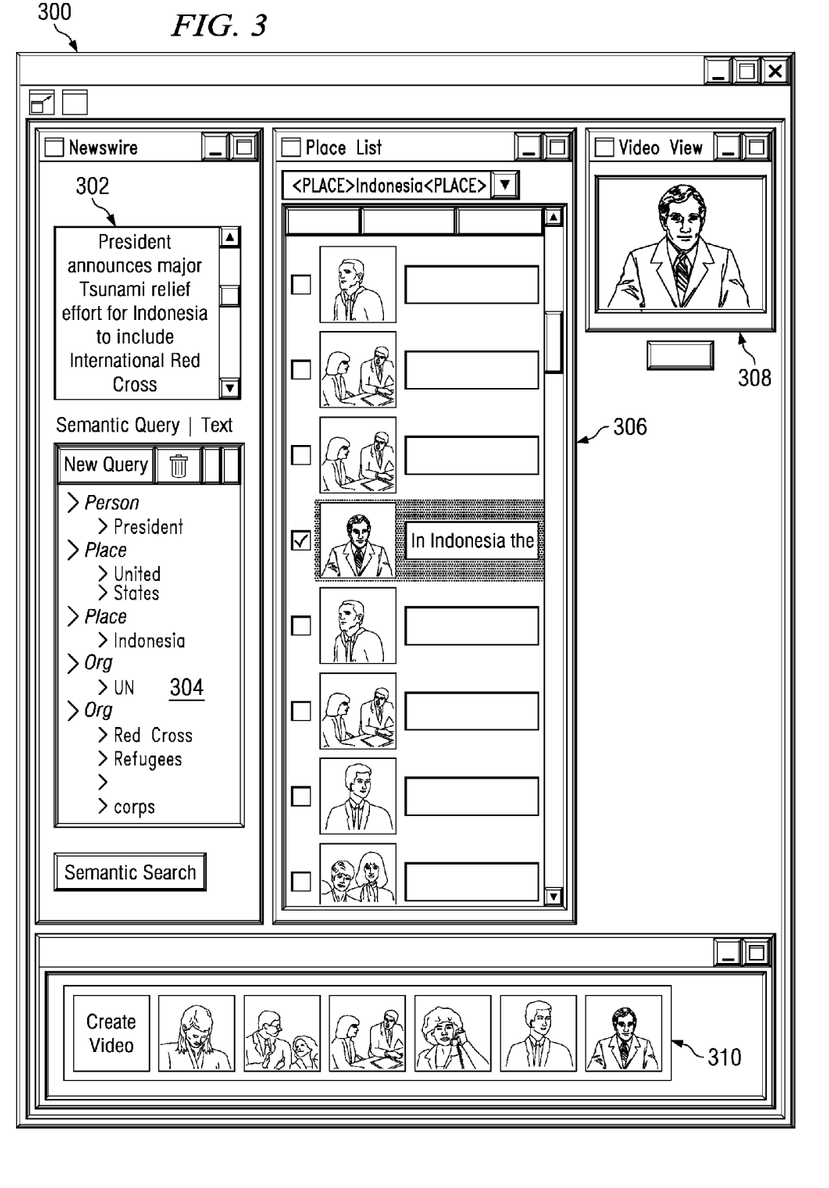
FIG. 3 is a schematic diagram showing an exemplary application of an embodiment of the invention.

Referring to FIG. 3, there is shown a display screen 300 configured to enable user interaction with an embodiment of the invention. More particularly, at display element 302 the screen depicts an input narrative, which has been entered in textual form and relates to a news event. Display element 304 depicts parsing the input narrative or story, in order to provide searchable query segments. Results retrieved by searching a multimedia repository, in response to respective queries, are shown at display element 306. Each result comprises an image, video clip, or other multimedia artifact associated with one of the queries. At display element 308, a user can view and inspect each retrieved artifact in greater detail. If the user decides to select an artifact for use in enriching the input narrative, the artifact is moved to display element 310, and assembled with other selected artifacts in an order or sequence determined by the user.

Figure 4:
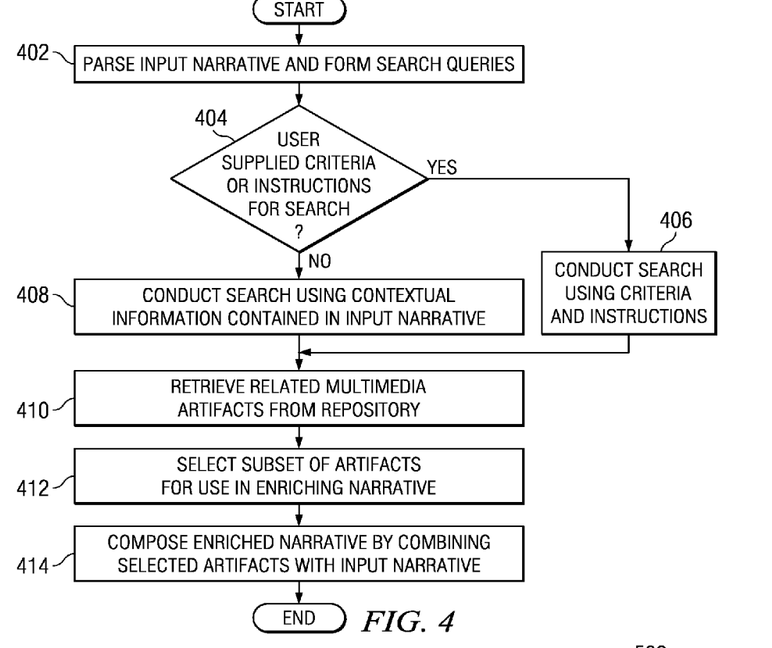
FIG. 4 is a flowchart showing principal steps for an embodiment of the invention.

Referring to FIG. 4, there are shown principal steps for a method or process in accordance with an embodiment of the invention, wherein the process starts upon receiving an input narrative as described above. The input narrative can comprise content material such as textual, video, audio, pictorial and/or graphic material, but is not limited thereto. At step 402, the narrative is parsed to provide segments or segmented elements which are used to form search queries. Narrative segments could comprise, depending on the nature of the narrative, story units, episodes, paragraphs, combination of words, video shots, events, activities, or concepts. However, the invention is not limited thereto.

At step 404, it is determined whether a user has supplied any criteria or instructions for guiding a multimedia search. Such criteria, without limitation, could include time or place information, types of multimedia to search for, content or contextual related information, and/or keywords. If no criteria or instructions have been provided, step 406 shows that respective queries, for use in searching a multimedia repository, are guided or assisted only by whatever contextual information is contained in the input narrative. However, if a user has supplied search criteria or instructions, such information is used in carrying out the search, as indicated by step 408.

In one embodiment of the invention, which is useful when the input narrative comprises text, the input narrative is parsed to extract tokens therefrom, wherein each token comprises a query associated with one of the narrative segments. Respective tokens are then sent to one or more multimedia repositories, in order to retrieve artifacts pertaining to their respective associated queries.

At step 410 of FIG. 4, each of the queries is used to retrieve related multimedia artifacts from a multimedia repository. Respective queries may be used in connection with procedures that comprise, for example, least content-based, text-based, speech-based, or model-based retrieval procedures.

As shown by step 412, a subset of the retrieved artifacts is selected for use in enriching the input narrative. Such selection step could include manual selection of artifacts by the user. Alternatively, retrieved artifacts can be automatically selected for the subset. For example, retrieved artifacts that match a particular segment of the narrative could be placed on a ranked list of matches for the particular segment. The best match for the segment, as shown by the ranked list, would then be placed into the subset. The selecting step could also be performed on the basis of semantics associated with temporal ordering, and could include a filtering procedure to ensure that no multimedia artifact in the subset is identical to any other artifact therein.

At step 414, the selected artifacts are combined with respective segments of input narrative, to compose an enriched narrative as an output.

Figure 5:
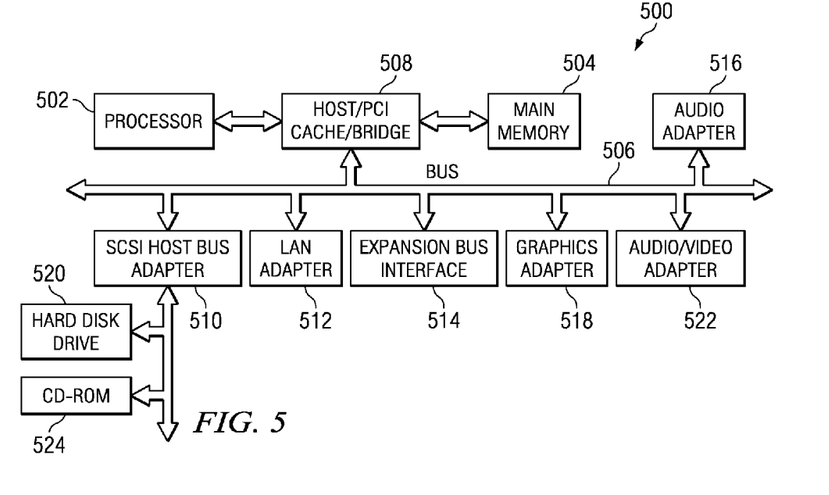
FIG. 5 is a block diagram showing a data processing system that may be used in implementing embodiments of the invention.

Referring to FIG. 5, there is shown a block diagram of a generalized data processing system 500 which may be used in implementing multimedia narrative enrichment system 100, or other embodiments of the present invention. Data processing system 500 exemplifies a computer, in which code or instructions for implementing the processes of the present invention may be located. Data processing system 500 usefully employs a peripheral component interconnect (PCI) local bus architecture, although other bus architectures such as Accelerated Graphics Port (AGP) and Industry Standard Architecture (ISA) may alternatively be used. FIG. 5 shows a processor 502 and main memory 504 connected to a PCI local bus 506 through a Host/PCI bridge 508. PCI bridge 508 also may include an integrated memory controller and cache memory for processor 502.

Referring further to FIG. 5, there is shown a local area network (LAN) adapter 512, a small computer system interface (SCSI) host bus adapter 510, and an expansion bus interface 514 respectively connected to PCI local bus 506 by direct component connection. Audio adapter 516, a graphics adapter 518, and audio/video adapter 522 are connected to PCI local bus 506 by means of add-in boards inserted into expansion slots. SCSI host bus adapter 510 provides a connection for hard disk drive 520, and also for CD-ROM drive 524.

An operating system runs on processor 502 and is used to coordinate and provide control of various components within data processing system 500 shown in FIG. 5. The operating system may be a commercially available operating system such as Windows XP, which is available from Microsoft Corporation. Instructions for the operating system and for applications or programs are located on storage devices, such as hard disk drive 520, and may be loaded into main memory 504 for execution by processor 502.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for enriching an input narrative with multimedia content, said method comprising the steps of:
    receiving said input narrative, wherein said input narrative comprises a description of an event in the form of text;
    selectively segmenting said input narrative, to form queries using text from the different text segments of said input narrative;
    using said queries to retrieve multimedia artifacts from one or more multimedia repositories, wherein each retrieved multimedia artifact is associated with one of said queries; and
    wherein each of said queries is processed to retrieve artifacts by means of a procedure selected from a group of procedures that include at least content-based, text-based, speech-based and model-based retrieval procedures;
    selecting a subset of said retrieved multimedia artifacts, wherein said retrieved artifacts of said subset include one or more nontextual artifacts that each does not include any of said segments of said input narrative; and
    combining said input narrative with each of said retrieved multimedia artifacts of said subset in an arrangement specified by a user, in order to provide an enriched narrative.

2. The method of claim 1, wherein: said retrieved multimedia artifacts are selected for said subset in accordance with pre-specified artifact selection criteria provided by a user.

3. The method of claim 2, wherein:
    said pre-specified artifact selection criteria includes at least time and place information respectively associated with said received narrative, and further includes the types of multimedia artifacts to select for said subset.

4. The method of claim 1, wherein:
    said specified arrangement comprises selectively following or preceding each of said input narrative segments with a corresponding retrieved multimedia artifact of said subset.

5. The method of claim 1, wherein:
    said segmenting step comprises parsing said input narrative and extracting tokens therefrom, wherein each token comprises a query associated with one of said narrative elements.

6. The method of claim 5, wherein:
    said tokens are sent to one or more multimedia repositories in order to retrieve artifacts pertaining to their respective associated queries.

7. The method of claim 1, wherein:
    said selecting step comprises automatically selecting respective retrieved artifacts for said subset.

8. The method of claim 1, wherein:
    retrieved artifacts that match a particular segmented element of the narrative are placed on a ranked list of matches for the particular segmented element.

9. The method of claim 8, wherein:
said selecting step comprises selecting the best match for the particular segmented element from the corresponding ranked list, and placing the best match into said subset.

10. The method of claim 1, wherein:
said selecting step includes a filtering procedure to ensure that no multimedia artifact in said subset is identical to any other artifact contained therein.

11. The method of claim 1, wherein said selecting step is performed on the basis of semantics associated with temporal ordering.

12. A computer program product in a computer readable medium for enriching an input narrative with multimedia content, said method comprising:
instructions for receiving said input narrative, wherein said input narrative comprises a description of an event in the form of text;
instructions for selectively segmenting said input narrative, to form queries using text from different text segments of said input narrative;
instructions for using said queries to retrieve multimedia artifacts from one or more multimedia repositories, wherein each retrieved multimedia artifact is associated with one of said queries; and
wherein each of said queries is processed to retrieve artifacts by means of a procedure selected from a group of procedures that include at least content-based, text-based, speech-based and model-based retrieval procedures;
instructions for selecting a subset of said retrieved multimedia artifacts, wherein said retrieved artifacts of said subset include one or more nontextual artifacts that each does not include any of said segments of said input narrative; and
instructions for combining said input narrative with each of said retrieved multimedia artifacts of said subset in an arrangement specified by a user, in order to provide an enriched narrative.

13. The computer program product of claim 12, wherein:
additional instructions are provided for processing each of said queries to retrieve artifacts by means of a procedure selected from a group of procedures that include at least content-based, text-based, speech-based and model-based retrieval procedures.

14. The computer program product of claim 12, wherein:
additional instructions are provided for automatically selecting respective retrieved artifacts for said subset.

15. The computer program product of claim 12, wherein:
additional instructions are provided for placing retrieved artifacts that match a particular segmented element of the narrative on a ranked list of matches for the particular segmented element, and the best match for the particular segmented element from the corresponding ranked list is selected and placed into said subset.

16. An apparatus for enriching an input narrative with multimedia content comprising:
a device for receiving said input narrative, wherein said input narrative comprises a description of an event in the form of text;
a device for selectively segmenting said input narrative, to form queries using text from different text segments of said input narrative;
a device for using said queries to retrieve multimedia artifacts from one or more multimedia repositories, wherein each retrieved multimedia artifact is associated with one of said queries; and
wherein each of said queries is processed to retrieve artifacts by means of a procedure selected from a group of procedures that include at least content-based, text-based, speech-based and model-based retrieval procedures;
a device for selecting a subset of said retrieved multimedia artifacts, wherein said retrieved artifacts of said subset include one or more nontextual artifacts that each does not include any of said segments of said input narrative; and
a device for combining said input narrative with each of said retrieved multimedia artifacts of said subset in an arrangement specified by a user, in order to provide an enriched narrative.

17. The apparatus of claim 16, wherein:
means are provided for processing each of said queries to retrieve artifacts by using a procedure selected from a group of procedures that include at least content-based, text-based, speech-based and model-based retrieval procedures.

18. The apparatus of claim 16, wherein:
means are provided for automatically selecting respective retrieved artifacts for said subset.

19. The apparatus of claim 16, wherein:
means are provided for placing retrieved artifacts that match a particular segmented element of the narrative on a ranked list of matches for the particular segmented element, and selecting the best match for the particular segmented element from the corresponding ranked list, and placing the best match into said subset.

\* \* \* \* \*